(12) United States Patent
Fujiki (10) Patent No.: US 6,856,325 B2
(45) Date of Patent: Feb. 15, 2005

(54) INFORMATION PROCESSING METHOD AND APPARATUS

(75) Inventor: Masakazu Fujiki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/395,133

(22) Filed: Mar. 25, 2003

(65) Prior Publication Data

US 2003/0184567 A1 Oct. 2, 2003

(30) Foreign Application Priority Data

Mar. 29, 2002 (JP) ........................................ 2002-095393

(51) Int. Cl.$^7$ ................................................ G09G 5/00
(52) U.S. Cl. ........................ 345/660; 345/666; 345/419
(58) Field of Search ................................ 345/660, 662, 345/664, 665, 666, 667, 668, 669, 670, 671, 419, 422

(56) References Cited

U.S. PATENT DOCUMENTS

| 6,023,276 A | | 2/2000 | Kawai et al. ................ 345/419 |
| 6,157,382 A | | 12/2000 | Ohshima et al. ............ 345/419 |
| 6,504,535 B1 | * | 1/2003 | Edmark ....................... 345/419 |
| 6,512,521 B1 | * | 1/2003 | Era ............................. 345/422 |
| 2002/0198047 A1 | * | 12/2002 | Hinami et al. | |

* cited by examiner

Primary Examiner—Matthew Luu
(74) Attorney, Agent, or Firm—Fitzpatrick, Cella, Harper & Scinto (57) ABSTRACT

A center position used for scaling a virtual object is calculated to generate a CG image suitable for observing the perspective of the virtual object. A scaling center of a virtual object disposed in a virtual space is obtained. When an image containing the virtual image corresponding to the position of a viewpoint is generated, the coordinate value of the scaling center is obtained in accordance with the viewpoint, and by using the coordinate value of the scaling center, the scaling process is executed for the virtual object.

15 Claims, 13 Drawing Sheets

INFORMATION PROCESSING METHOD AND APPARATUS

BACKGROUND OF THE INVENTION

1. Field of the Invention

The present invention relates to a scaling process for a virtual object in a virtual space.

2. Related Background Art

For a three-dimensional computer graphics (hereinafter described as 3DCG) system for generating an image of an object in a three-dimensional space projected on a two-dimensional plane, techniques are known which magnify/reduce (scale) the size of an object as desired by using a predetermined point in the three-dimensional space as a center.

In such a 3DCG system, two methods of setting a center position of scaling are known:

(1) the center position is set to a predetermined fixed position; and (2) a system operator interactively sets the center position by looking at a projected image of an object.

In the former method, the scaling center is set to the origin of a coordinate system specific to an object. In the latter method, an apex of a cube circumscribing an object is designated on a projected image with a pointing device, and this apex is used as the scaling center.

In both the methods, since the scaling center is determined irrelevant to a viewpoint, a projected image of the object becomes sometimes not suitable for the observation of the object, depending upon the position of the scaling center.

Figure 8:
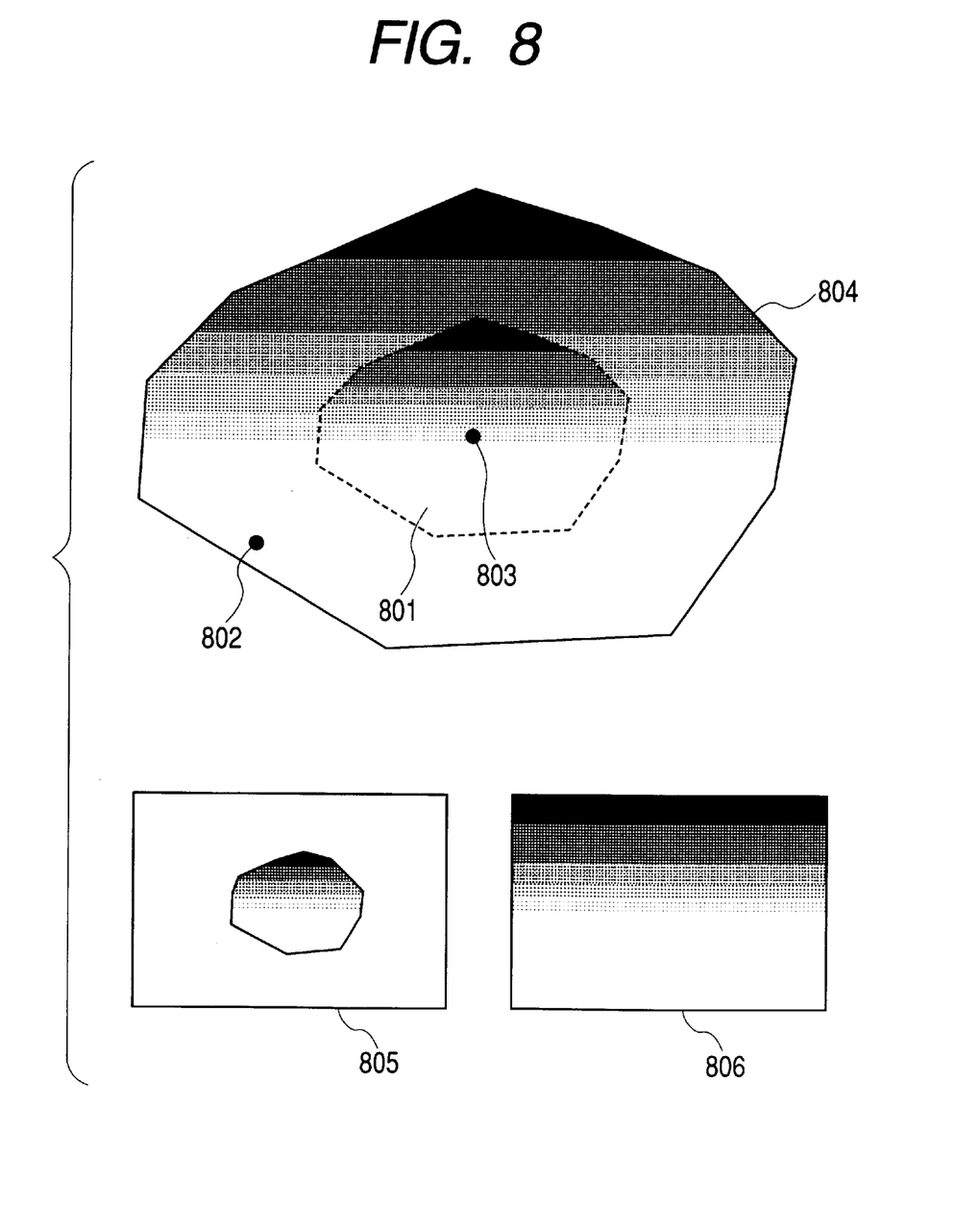
FIG. 8 is a diagram explaining a first conventional problem.

FIG. 8 is a diagram showing an example of such problems. In FIG. 8, reference numeral 801 represents a virtual object before magnification, reference numeral 802 represents a viewpoint from which the object is observed, and reference numeral 803 represents a scaling center. If the object 801 is magnified uniformly in all directions around the scaling center 803, the object 801 is changed to an object 804. It is assumed that this system aims to observe the perspective of the object 801 or 804.

As shown in FIG. 8, before the scaling, the viewpoint 802 is outside the object 801 and the perspective of the object can be observed in a projected image 805.

However, after the scaling, the viewpoint 802 is inside the object 804 so that a projected image 806 shows the inside of the object and the system objective of observing the perspective is not achieved. Depending upon setting of a scaling center, there is associated with a problem that the viewpoint from which an object is observed is positioned inside the object. This problem is called a "first problem."

Figure 9:
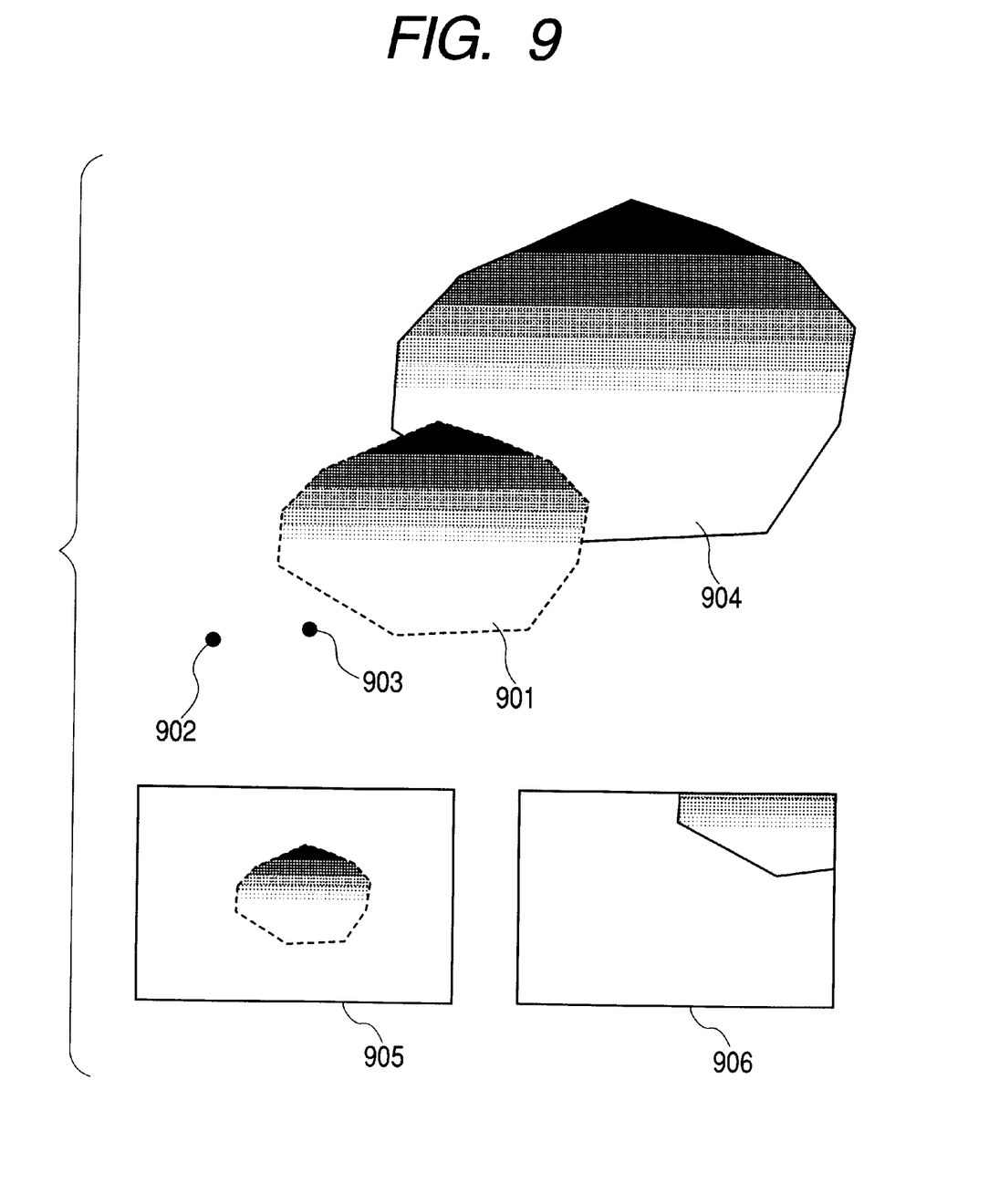
FIG. 9 is a diagram explaining a second conventional problem.

FIG. 9 is a diagram showing another example of the problems. In FIG. 9, reference numeral 901 represents a virtual object before magnification, reference numeral 902 represents a viewpoint from which the object is observed, and reference numeral 903 represents a scaling center. If the object 901 is magnified uniformly in all directions around the scaling center 903, the object 901 is changed to an object 904. It is assumed that this system aims to observe the perspective of the object 901 or 904. Before the scaling, an image of the object 901 observed from the viewpoint 902 is an image 905 and the perspective of the object can be observed.

However, after the scaling, the object moves away from the viewpoint so that only a portion of the object can be observed as a projected image 906 or the size of a projected image becomes very small and the, details are difficult to be observed. Depending upon setting of a scaling center, there is associated with a problem that an object to be observed moves away from the viewpoint. This problem is called a "second problem."

SUMMARY OF THE INVENTION

It is an object of the invention to solve the above-described problems and generate an image capable of adequately observing a scaled virtual object.

More specifically, it is an object of the invention to prevent the position of a viewpoint from being set inside a virtual object and the position of the viewpoint from being moved away from the position of the virtual object, during scaling of the virtual object.

It is another object of the invention to properly perform scaling when a plurality of observers shares a virtual space in which a virtual object is disposed.

It is another object of the invention to properly perform scaling by setting a scaling processing method suitable for the scaling processing contents.

In order to achieve the above objects, the invention provides the following characteristic structures.

According to one aspect of the invention, an information processing method of obtaining a scaling center of a virtual object disposed in a virtual space and generating an image containing the virtual object corresponding to a position of a viewpoint, is provided which comprises steps of: obtaining a coordinate value of the scaling center in accordance with the viewpoint; and executing a scaling process for the virtual object by using the coordinate value of the scaling center.

According to another aspect of the invention, an information processing method of controlling a scaling process for a virtual object disposed in a virtual space shared by an observer, is provided which comprises: selecting a method of obtaining a scaling center, in accordance with the number of positions of viewpoints of the observer to be considered when the scaling process is executed; by using the selected method of obtaining the scaling center, obtaining a coordinate value of the scaling center corresponding to the position of each viewpoint of the observer; and by using the obtained coordinate value of the scaling center, executing the scaling process for the virtual object.

According still another object of the invention, an information processing method of controlling a scaling process for a virtual object disposed in a virtual space, is provided which comprises steps of: selecting a method of obtaining a scaling center, in accordance with the contents of the scaling process; by using the selected method of obtaining the scaling center, obtaining a coordinate value of the scaling center corresponding to the position of a viewpoint of an observer; and by using the obtained coordinate value of the scaling center, executing the scaling process for the virtual object.

Other features and advantages of the present invention will become apparent from the following description taken in conjunction with the accompanying drawings, in which like reference characters designate the same or similar parts throughout the figures thereof.

DESCRIPTION OF THE PREFERRED EMBODIMENTS

In the first embodiment of the invention, a scaling center determination apparatus will be described which calculates the coordinate value of a scaling center under a single or a plurality of observation conditions.

In the second embodiment of the invention, a CG image generating apparatus will be described by taking as an example a virtual reality experience system.

(First Embodiment)

The details of a scaling center determination apparatus according to the first embodiment of the invention will be given by referring to the accompanying drawings.

Figure 11:
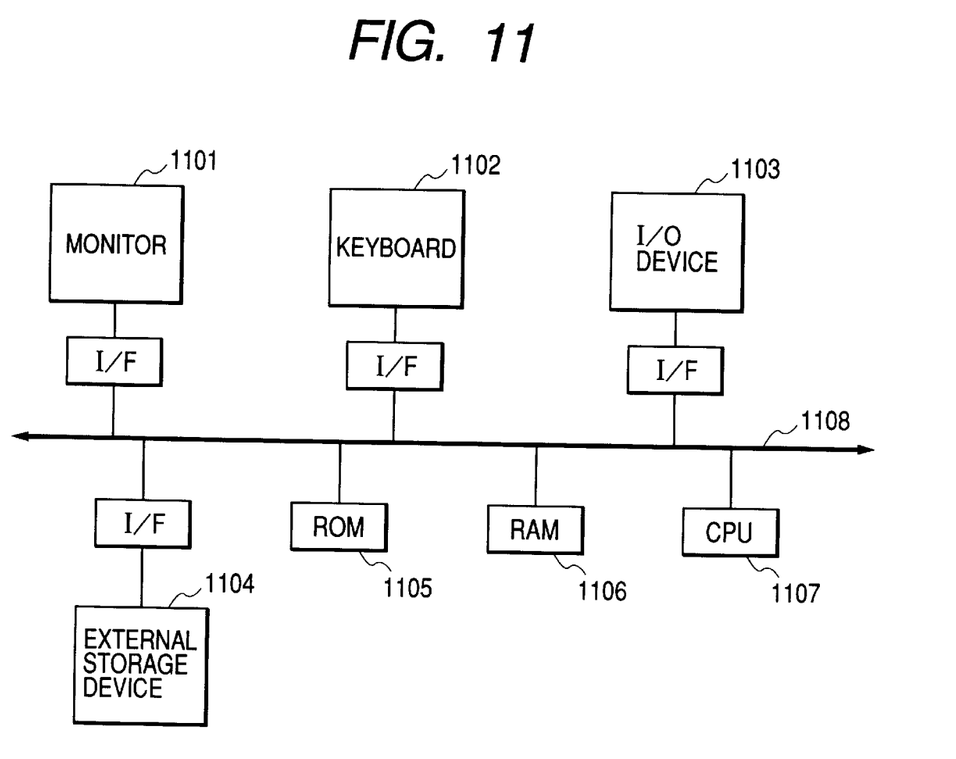
FIG. 11 is a block diagram showing the structure of a scaling center setting apparatus according to the first embodiment.

FIG. 11 shows the hardware structure of the scaling center determination apparatus. In this apparatus, three-dimensional CG data (hereinafter simply called "CG data") of a virtual object to be scaled and data of an observation condition (hereinafter called "observation condition data") are stored in an external storage device 1104 or externally supplied via an I/O device 1103.

The CG data includes at least data for describing the shape of a virtual object (data of three-dimensional positions of a point group on a virtual object and patch links between points). The observation condition data includes at least the number of viewpoints from which a virtual object is observed and the coordinates of each viewpoint. The CG data or observation condition data may be stored in one data file or data block, or may be stored divisionally in a plurality of data files or data blocks. The CG data and observation condition data may be stored both in one data file or data block.

The CG data and observation condition data are processed by a program loaded in a RAM 1106 from the external storage device 1104 or from a ROM 1105 to calculate the coordinates of a scaling center.

This processed result is stored in the external storage device 1104 or output to the external via the I/O device 1103. The program is executed by a CPU 1107.

A keyboard 1102 is used for entering the name of a file in which the CG data and observation condition data are stored.

A monitor 1101 is used for confirming an input from the keyboard and a processed result. These components 1101 to 1107 are interconnected by a bus 1108.

Figure 1:
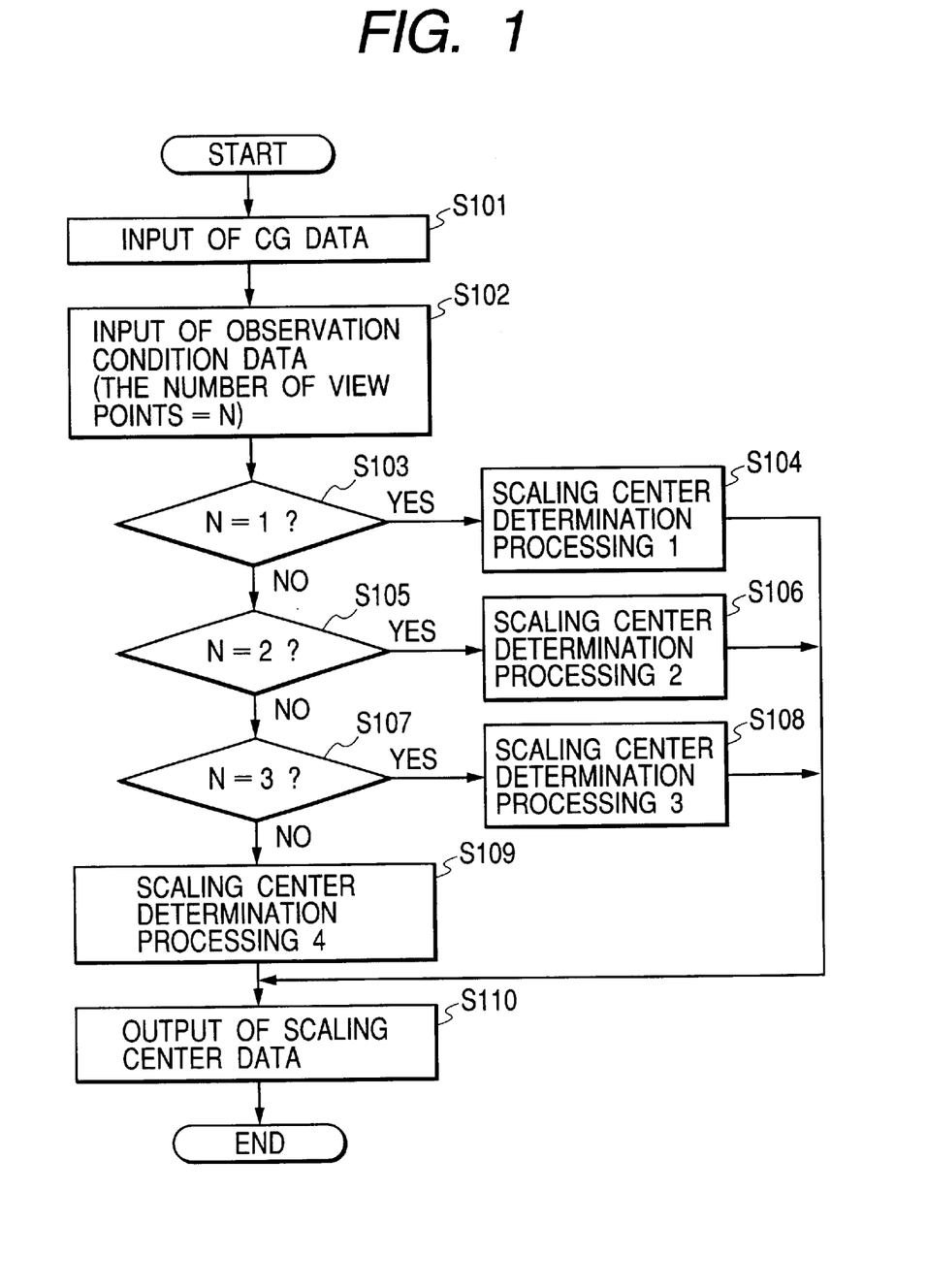
FIG. 1 is a flow chart illustrating a scaling center setting procedure according to a first embodiment.

By referring to FIG. 1, the procedure to be executed by the scaling center determination apparatus of the embodiment will be described.

First, the CG data is input in RAM 1106 at Step S101 and the observation condition data is input in RAM 1106 at Step S102. The number of viewpoints contained in the observation condition data is represented by N where N is an integer of 1 or larger.

Next, at Step S103, S105 or S107, the number of viewpoints is checked. If the number of viewpoints is 1, Step S104 follows, if the number of viewpoints is 2, Step S106 follows, if the number of viewpoints is 3, Step S108 follows, and if the number of viewpoints is 4 or larger, Step S109 follows. The details of Steps S104, S106, S108 and S109 will be given later.

After Step S104, S106, S108 or S109 is completed, the coordinate data (hereinafter called "scaling center data") of the scaling center calculated at S110 is output.

The procedure of determining a scaling center becomes different depending upon the number of viewpoints from which an object is observed. Each procedure corresponding to each of the numbers of viewpoints will be described in detail.

Figure 5:
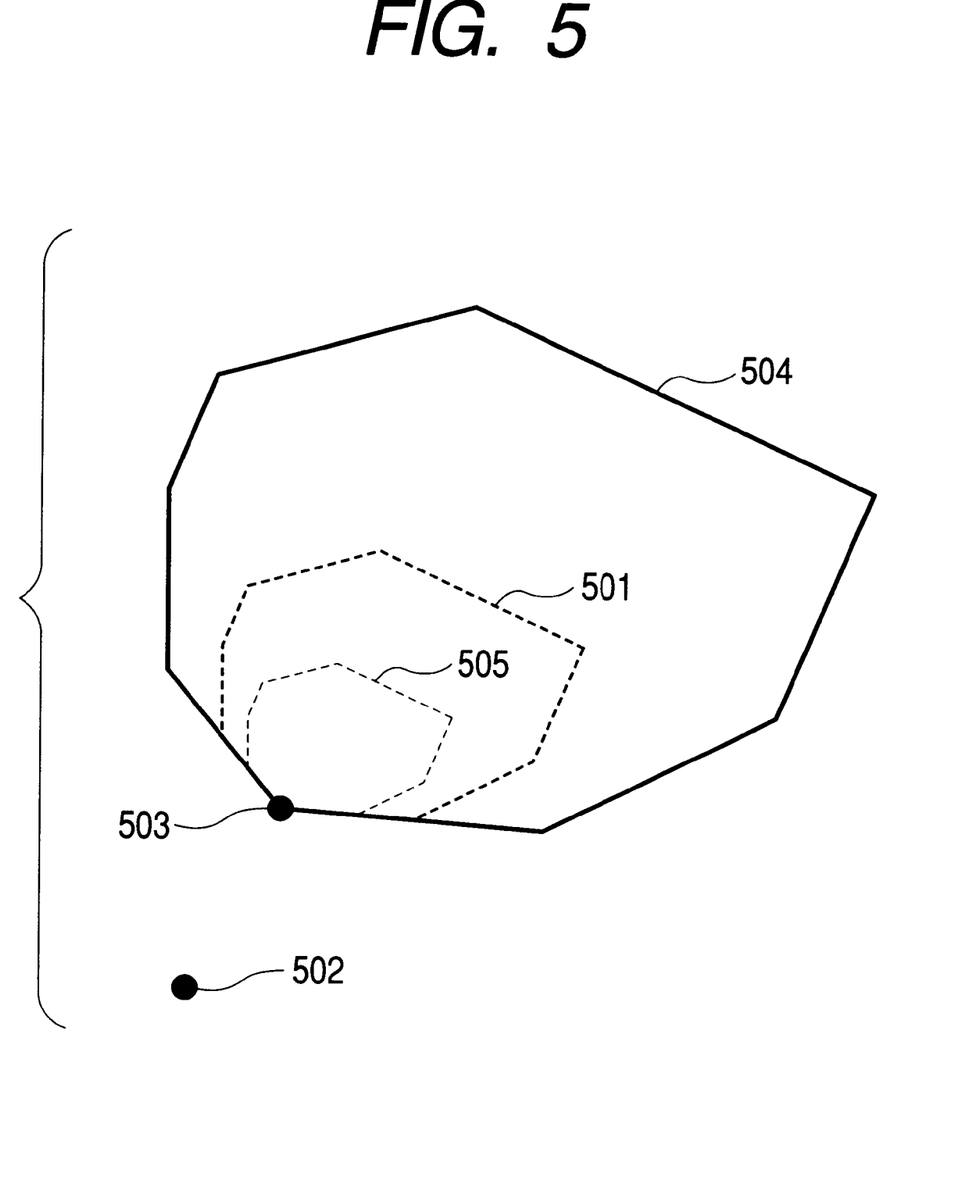
FIG. 5 is a conceptual diagram illustrating a scaling center determination method when there is one viewpoint.

The method to be performed when there is one viewpoint is illustrated in the conceptual diagram shown in FIG. 5. In order to make it easy to understand the main issue, a two-dimensional image is drawn in FIG. 5. The contents of the following description can also be applied generally to a three-dimensional image.

In FIG. 5, reference numeral 501 represents a virtual object to be scaled, and reference numeral 502 represents the position of a viewpoint. In this embodiment, the scaling center is set to a point (hereinafter called the "nearest point") 503 on an object 501 nearest to the viewpoint 502.

If the object 501 is magnified or reduced at a certain magnification or reduction factor by setting the scaling center to the nearest point 503, the object changes its size and position as indicated at 504 or 505. As seen from FIG. 5, by setting the scaling center to the nearest point, the object can be magnified or reduced without changing the distance between the viewpoint and object.

Both the first and second problems described earlier can therefore be solved by the scaling center determination method of the embodiment to be used when there is one viewpoint.

The process at Step S104 of determining the scaling center, i.e., the nearest point when there is one viewpoint will be described with reference to FIG. 2.

With this process, the coordinate value of a point on each polygon constituting a virtual object nearest from a viewpoint and the distance of the point from the viewpoint are calculated, and a point having the shortest distance from the viewpoint among all polygons is set to the nearest point.

At Step S201 the value of a variable Lmin for storing the shortest distance from the viewpoint (point. V) is set so that $1/Lmin = \epsilon$ is satisfied where $\epsilon$ is a floating point value sufficiently smaller than an inverse number of a distance between the viewpoint and virtual object.

Next, at Step S202 one polygon is selected (it is assumed that the selected polygon is an n-th polygon).

At Step S203 the coordinate value of a point Pn on the selected polygon having the shortest distance from the viewpoint is calculated.

At Step S204 it is checked whether the distance between the viewpoint V and point Pn is 0, if 0, the point Pn is set to the nearest point Pmin at Step S205 to thereafter terminate the process. If the check result at Step S204 is not 0, Step S206 follows.

At Step S206 the length of a line segment VPn is compared with Lmin, and if VPn<Lmin, then the length of the line segment VPn is stored in Lmin as the shortest distance.

At Step S208, the point Pn is set to the nearest point Pmin to thereafter advance to Step S209.

If it is judged at Step S206 that it is not Vpn<Lmin, the flow advances to Step S209 without renewing Lmin and Pn.

At Step S209 it is judged whether the above-described process was performed for all polygons. If not, the flow returns to Step S202 to select another polygon still not processed and repeat the above process.

Figure 2:
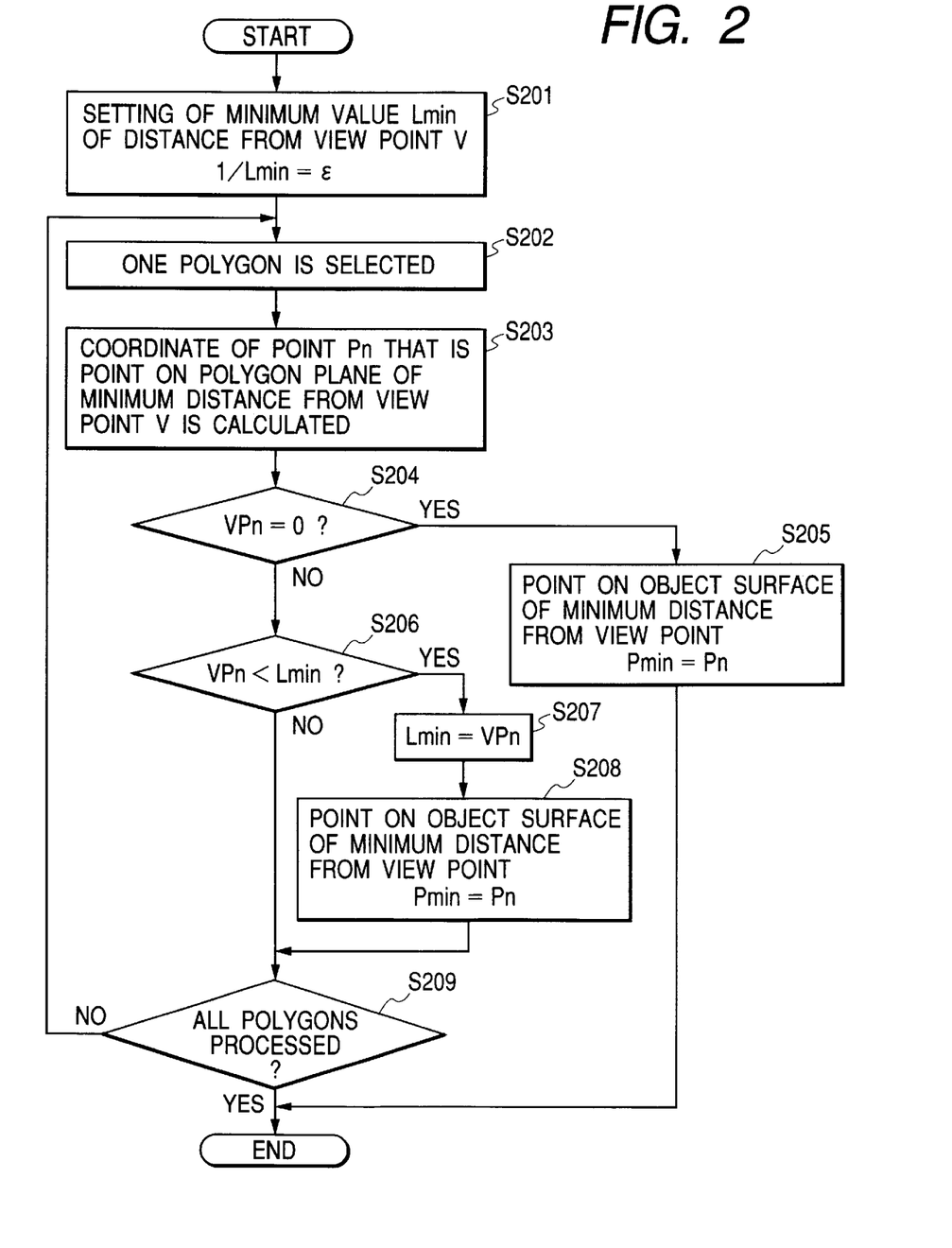
FIG. 2 is a flow chart illustrating a procedure of obtaining a point on a virtual object having the shortest distance from a viewpoint.

The process of calculating the nearest point is not limited only to that illustrated in FIG. 2. For example, if a virtual object is almost a sphere, a sphere circumscribing the object is introduced and an intersection between the line segment interconnecting the viewpoint and the center of the circumscribing sphere is set to the nearest point.

Figure 6:
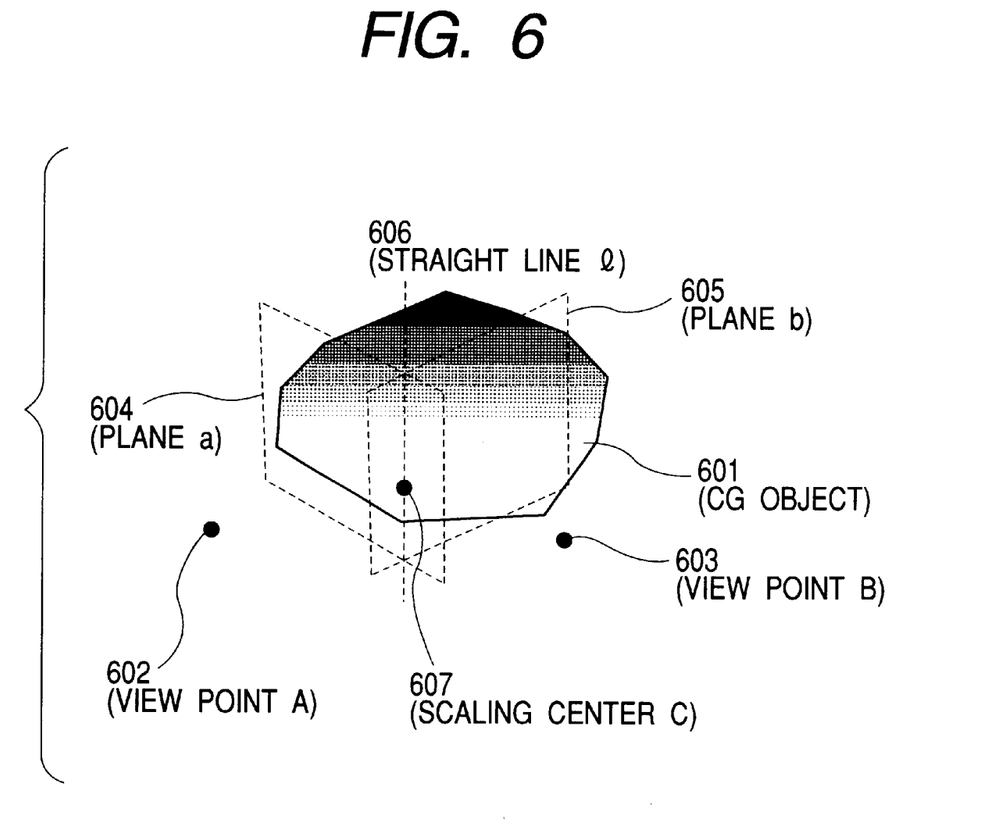
FIG. 6 is a conceptual diagram illustrating a scaling center determination method when there are two viewpoints.

The process at Step S106 of determining the scaling center when there are two viewpoints is illustrated in the conceptual diagram of FIG. 6.

In FIG. 6, reference numeral 601 represents a virtual object to be scaled. Reference numerals 602 and 603 represent the positions of two viewpoints. The viewpoint 602 is called a viewpoint A and the viewpoint 603 is called a viewpoint B.

Reference numeral 604 represents a plane (hereinafter called the "nearest plane" which is perpendicular to the line segment between the viewpoint A 602 and the nearest point and intersects the point (nearest point not shown) on the object 601 having the shortest distance from the viewpoint A 602. Similarly, reference numeral 605 represents the nearest plane relative to the viewpoint B. The nearest planes 604 and 605 are hereinafter called planes a and b, respectively.

In the method of this embodiment, a point on the intersection l 606 between the planes a and b having the minimum value of a square sum of distances from the viewpoints A and B is set to the scaling center.

Figure 10:
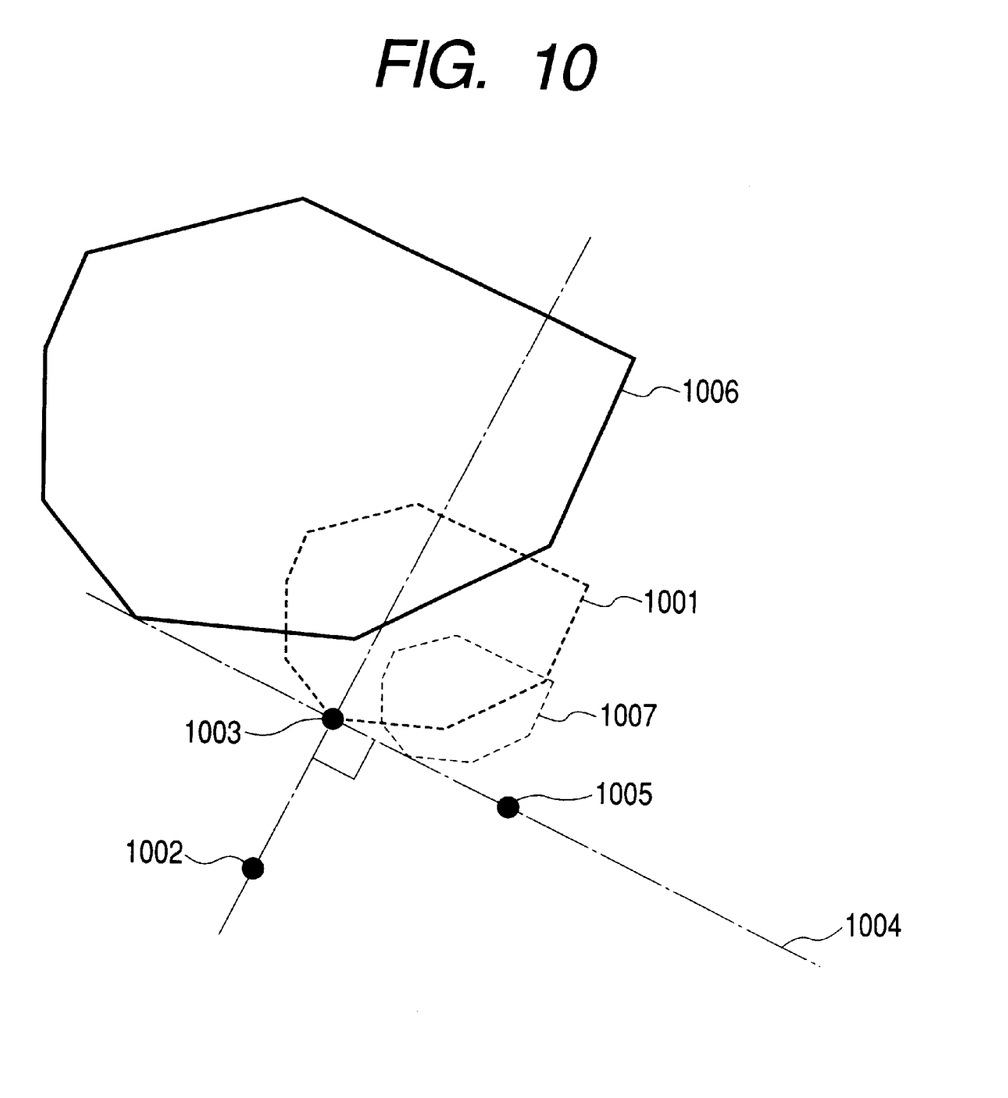
FIG. 10 is a conceptual diagram showing a change in the position of a virtual object caused by magnification/reduction.

FIG. 10 is the conceptual diagram illustrating a change in the position of an object subjected to magnification/reduction when the scaling center is set on the nearest plane. In order to make it easy to understand the main issue, a two-dimensional image is drawn in FIG. 10. The contents of the following description can also be applied generally to a three-dimensional image.

In FIG. 10, reference numeral 1001 represents a virtual object to be scaled, reference numeral 1002 represents a viewpoint, and reference numerals 1003 and 1004 represent the nearest point and nearest plane relative to the viewpoint. Assuming that a point 1005 different from the nearest point on the nearest plane 1004 is set to the scaling point, if the virtual object 1001 is magnified or reduced at a certain magnification or reduction factor, the object changes its size and position as indicated at 1006 or 1007.

As seen from FIG. 10, by setting the scaling center to a point on the nearest plane, the object can be magnified or reduced without changing the distance between the nearest plane and object. Therefore, the virtual object subjected to scaling will not move nearer to the viewpoint than the nearest plane. However, the relative position between the viewpoint and object is changed by scaling. This change is smaller the shorter the distance between the viewpoint 1002 and scaling center 1005 is.

With the scaling center determination method using the scaling center on the nearest plane described with reference to FIG. 6, the scaling center is on the nearest planes of both the two viewpoints so that the first problem described earlier can be solved. Furthermore, from the points on the intersection between the two nearest planes, a point having the shorter distance from the two viewpoints is selected as the scaling center. It is therefore possible to suppress the occurrence of the second problem.

Figure 3:
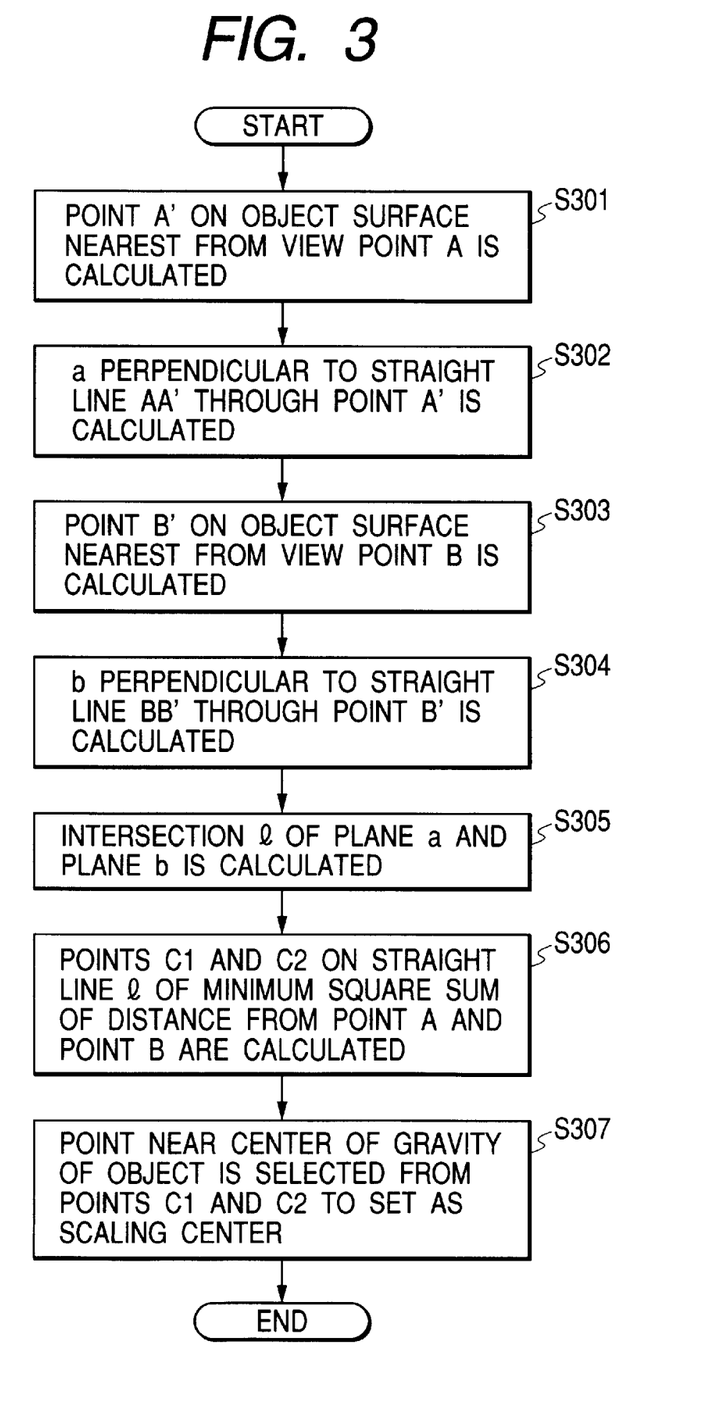
FIG. 3 is a flow chart illustrating a procedure of calculating a scaling center when there are two viewpoints.

The details of the process at Step S106 will be described with reference to the flow chart of FIG. 3.

First, at Step S301 the coordinate value of a nearest point A' from the viewpoint A is calculated. The calculation procedure is similar to that described with reference to FIG. 2. Next, at Step S302 the equation representative of the plane a is calculated, the plane a being intersecting the nearest point A' and being perpendicular to the line segment interconnecting the viewpoint and nearest point. At Steps S303 and S304, the processes similar to those described above are executed for the viewpoint B.

Next, at Step S305 the equation representative of the intersection l between the nearest planes a and b is calculated. At Step S306 the coordinate values of points C1 and C2 are calculated, the points C1 and C2 being positioned on the straight line l and having the minimum value of a square sum of the distances from the viewpoints A and B.

Lastly, at Step S307 one of the points C1 and C2 is selected which has a shorter distance from the center of gravity of the virtual object, and the coordinate value of the selected point is set to the coordinate value of the scaling center to terminate the scaling center calculation procedure.

Figure 7:
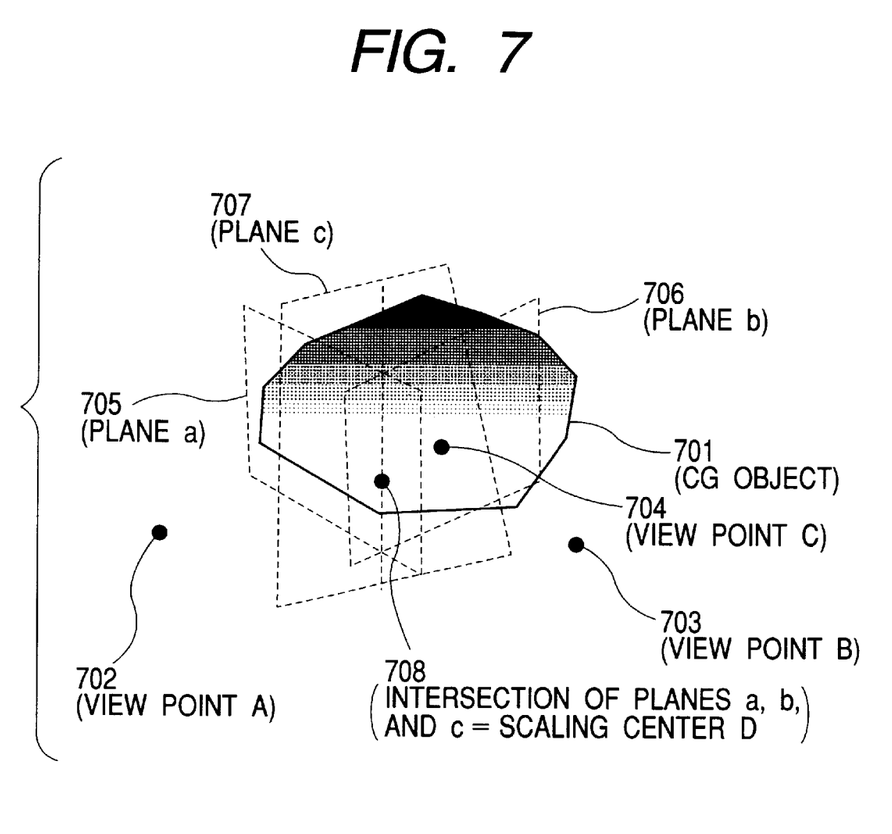
FIG. 7 is a conceptual diagram illustrating a scaling center determination method when there are three viewpoints.

The scaling center determination method to be performed when there are three viewpoints is illustrated in the conceptual diagram shown in FIG. 7. In FIG. 7, reference numeral 701 represents a virtual object to be scaled, and reference numerals 702, 703 and 704 represent the positions of three viewpoints. The viewpoints 702, 703 and 704 are hereinafter called a viewpoint A, a viewpoint B and a viewpoint C, respectively.

Reference numeral 705 represents a plane (nearest plane), which is perpendicular to the line segment between the viewpoint A 702 and the nearest point and intersects the point (nearest point not shown) on the object 701 having the shortest distance from the viewpoint A 702. Similarly, reference numeral 706 represents the nearest plane relative to the viewpoint B, and reference numeral 707 represents the nearest plane relative to the viewpoint C. The nearest planes 705, 706 and 707 are hereinafter called planes a, b and c, respectively.

In the method of this embodiment, a point on the intersection among the three planes a, b and c is set to the scaling center. Therefore, even if the virtual object is scaled, the object will not move nearer to the viewpoints than the corresponding nearest planes. This method can therefore avoid the occurrence of the first problem.

Figure 4:
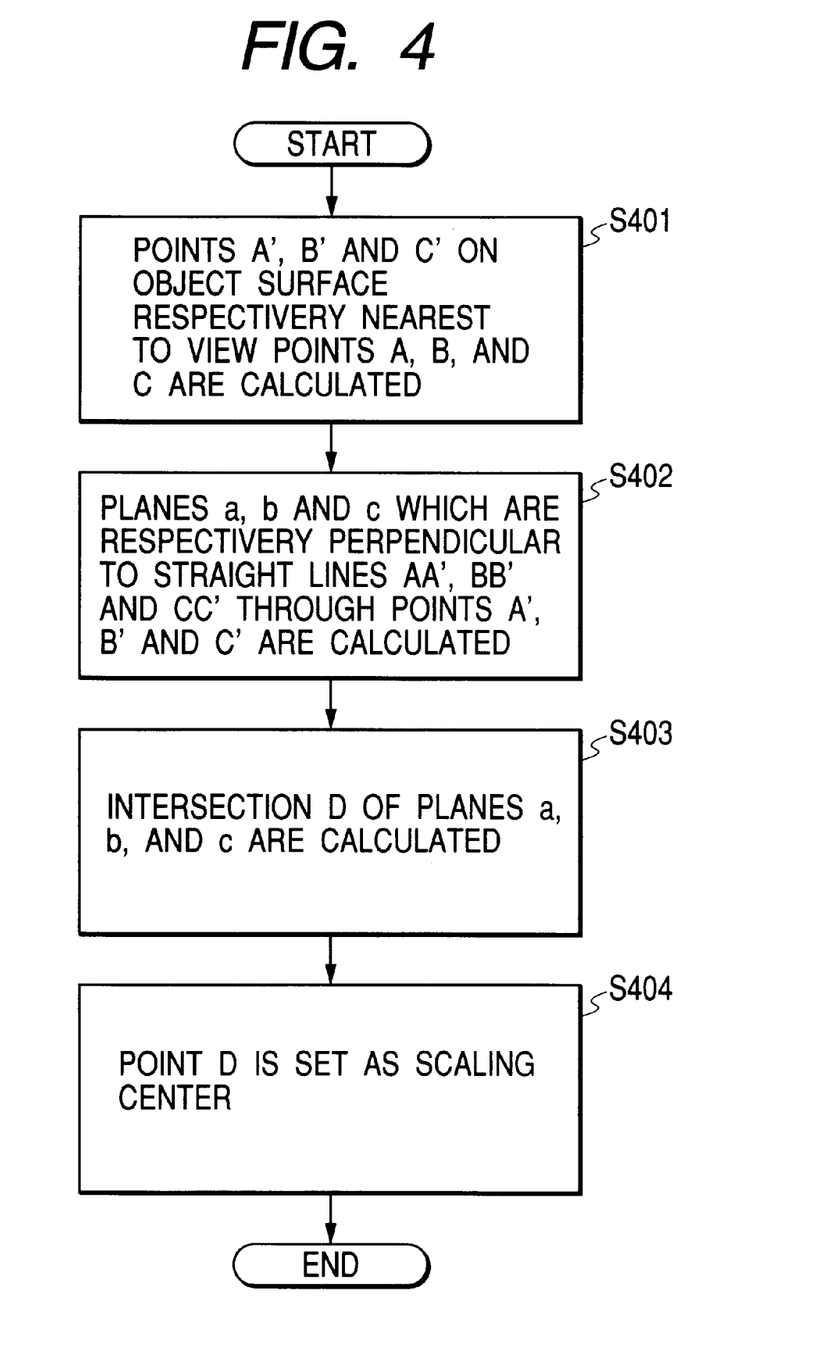
FIG. 4 is a flow chart illustrating a procedure of calculating a scaling center when there are three viewpoints.

The details of the process at Step S108 will be described with reference to the flow chart shown in FIG. 4.

First, at Step S401, the coordinate values of nearest points A', B' and C' are calculated for the three viewpoints A, B and C. The nearest point calculation procedure is similar to that described with reference to FIG. 2.

Next, at Step S402, the equations representative of the nearest planes a, b and c for the viewpoints A, B and C are obtained.

A point D on the intersection among the three planes is calculated (Step S403), and the coordinate value of the point D is set to the coordinate value of the scaling center (Step S404) to terminate the scaling center calculation procedure.

If the number of observation conditions is four or larger, the nearest planes for the viewpoints do not always intersect. Therefore, it is not always possible to prevent all the viewpoints from being set inside the virtual object when it is magnified. From this reason, in order to suppress the occurrence of the second problem, the distances between the viewpoints and scaling center is made as short as possible. To this end, the coordinate value of a point having the minimum value of a square sum of distances from the viewpoints is calculated at Step S109, and this point is used as the scaling center. Alternatively, since there is a high possibility that the viewpoints surround the virtual object if the number of observation conditions is four or larger, a center of gravity of viewpoints is simply used as the scaling center instead of using the method of calculating a point having the minimum value of a square sum of distances from the viewpoints.

Preferential viewpoints up to three viewpoints may be selected from all of four or more viewpoints and Step S104, S106 or S108 is selected in accordance with the number of selected viewpoints to calculate the scaling center. In this manner, the first problem does not occur at least for the selected viewpoints. In this case, one step of selecting viewpoints up to three viewpoints (1 to 3) is inserted between Steps S102 and S103 shown in FIG. 1.

In selecting a preferential viewpoint or viewpoints, one of the following methods can be utilized:

(1) entering the number of a viewpoint from the keyboard;
(2) displaying a menu of viewpoint numbers on the monitor 1101 and pointing one or more viewpoint numbers with an interactive device such as a mouse; or
(3) reading a data file capable of designating a viewpoint or viewpoints to be selected.

The problems can be solved in some cases more easily than determining the scaling center from the positions of viewpoints. For example, if the number of observation conditions is four or larger and viewpoints are disposed generally at an equal interval to surround a virtual object, the second problem may be solved by setting the center of gravity of the object as the scaling center.

The scaling center may therefore be selectively determined either by a method based upon the positions of viewpoints or a method not based upon the positions of viewpoints.

In selecting one of these two methods, a key of the keyboard 1102 assigned to each of the two methods may be depressed, a button of a selector connected to the I/O device 1103 may be depressed, and so on.

The scaling center determination method may be selectively used in accordance with the contents of scaling, i.e., magnification or reduction, as well as the number of viewpoints. For example, at Step S108, the procedure shown in FIG. 4 is performed if the scaling contents correspond to magnification, or the center of gravity of viewpoints is used as the scaling center if the scaling contents correspond to reduction.

(Second Embodiment)

In this embodiment, a CG image generating apparatus using the scaling center determination method of the invention will be described.

Figure 12:
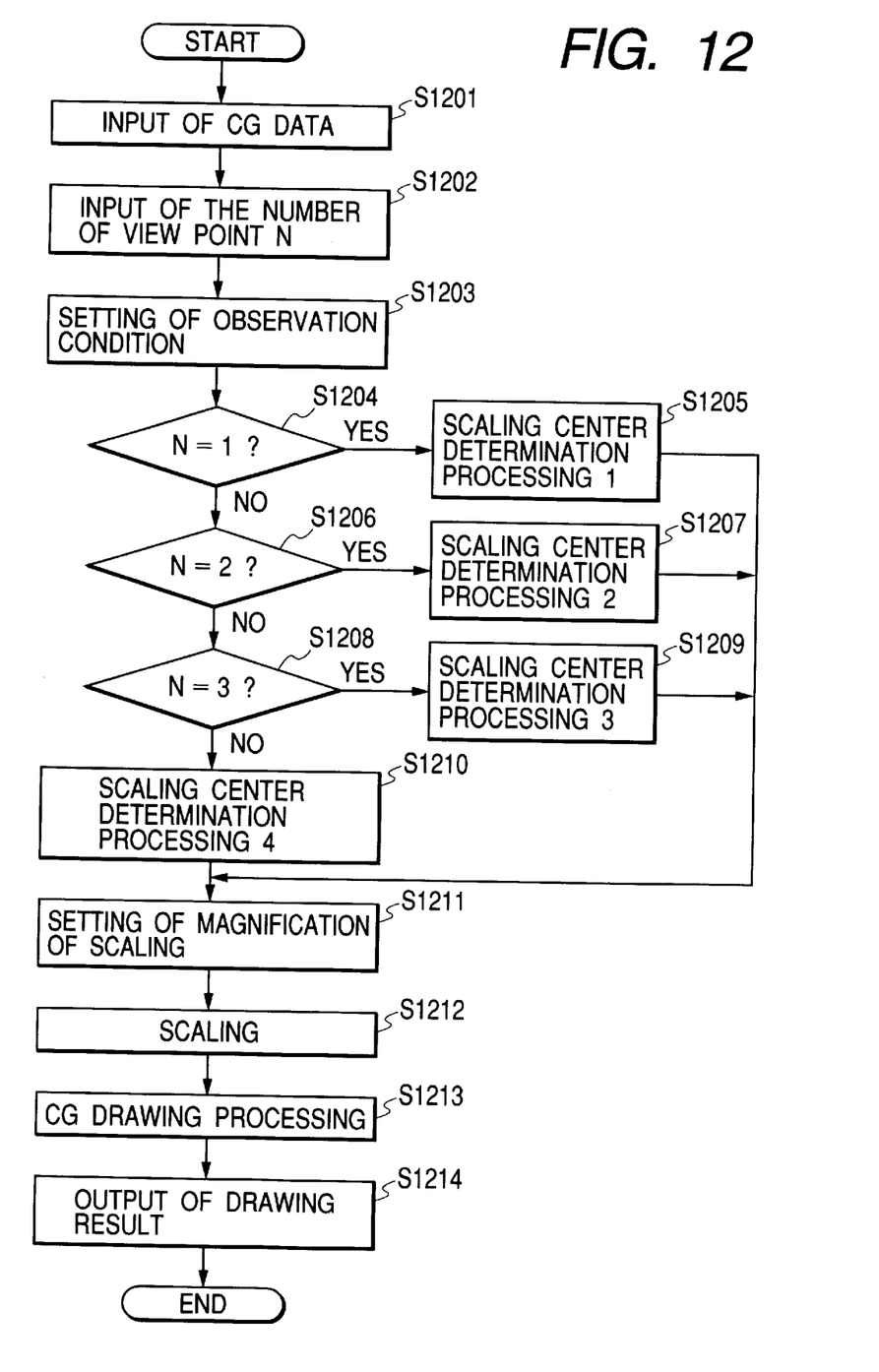
FIG. 12 is a flow chart illustrating a CG image generating procedure according to a second embodiment.

FIG. 12 is a flow chart illustrating the CG image generating apparatus of the embodiment. The process contents at Steps S1201, S1204, S1205, S1206, S1207, S1208, S1209 and S1210 are the same as those at Steps S101, S103, S104, S105, S106, S107, S108 and S109, respectively.

At Step S1202 the number of viewpoints is input, and at Step S1203 the observation conditions (viewpoint position, observation direction and view angle) of each viewpoint are set. In setting the observation conditions, numerical values written in advance in a data file may be read, only the position of a viewpoint and the observation direction may be read from an output of a three-dimensional position posture sensor installed at the position of a viewpoint, and so on.

At Step S1211 a scaling magnification factor of a virtual object is set. In this case, the scaling magnification factor is entered as text, for example, by using the keyboard.

At Step S1212, in accordance with data of the scaling center determined at Step S1205, S1207, S1209 or S1210, a scaling conversion process is executed for the virtual object.

Next, in accordance with the observation conditions set at Step S1202, the virtual object is projected on the two-dimensional plane to generate an image (Step S1213), and at Step S1214 an output process is executed to display the image on a computer display or store the image in the external storage device as the image data.

With the above-described processes, one CG image at one viewpoint is generated. In generating a CG moving image, the processes at Steps S1203 to S1214 are repeated.

Figure 13:
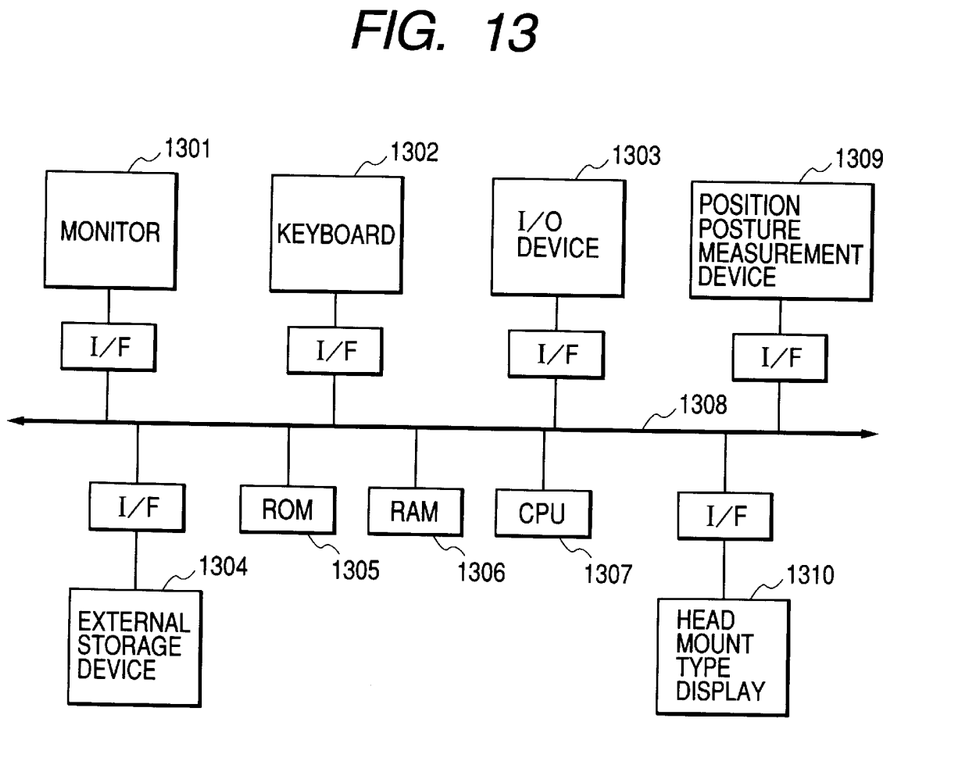
FIG. 13 is a block diagram showing the structure of a virtual reality experience apparatus according to the second embodiment.

FIG. 13 is a block diagram showing the structure of a virtual reality experience system as an example of the CG image generating apparatus of the embodiment. This apparatus sets the position of a viewpoint and the posture in accordance with the measurement results read from a position posture measurement device 1309, and a drawing result is output to a head mount type display 1310.

As many position posture measurement devices and head mount type displays as the number of observation conditions, i.e., the number of viewpoints, are prepared. The position posture measurement device is fixed to the head mount type display. An observer of CG images puts this display on the head so that CG images of a virtual object can be observed in the view field corresponding to the head position posture. In accordance with the position of the viewpoint of the observer, the scaling center is determined so as to avoid the first problem, second problem or both.

(Other Embodiments)

The coordinate value of each scaling center calculated in the embodiments may be a different coordinate value unless the different coordinate value departs from the concept of the scaling center defined in the embodiments. For example, the coordinate value calculated at Step S203 may be changed to the center of gravity of a polygon selected at Step S202. Namely, at Step S203 a coordinate value (position) on the surface of the virtual object having generally a shortest distance from the viewpoint may be used. This is also applicable to the other scaling center determination methods if the coordinate value indicates generally the same position as calculated by the embodiment method.

The invention may be applied to a system constituted of a plurality of apparatuses or to a single apparatus. It is obvious that the invention is also applicable to the case wherein a program realizing the embodiment functions is supplied to the system or apparatus. In this case, the storage medium storing such a program constitutes the invention. The program is read from the storage medium to the system or apparatus, which operates in a predetermined manner.

Although the present invention has been described above with respect to the preferred embodiments, the invention is not limited to the foregoing embodiments but many modifications and variations are possible within the spirit and scope of the appended claims of the invention.

What is claimed is:

1. An information processing method of obtaining a scaling center of a virtual object disposed in a virtual space and generating an image containing the virtual object corresponding to a position of a viewpoint, comprising steps of:

obtaining a coordinate value of the scaling center in accordance with the viewpoint; and executing a scaling process for the virtual object by using the coordinate value of the scaling center.

2. An information processing method according to claim 1, wherein the coordinate value of the scaling center is a coordinate value of a point on a surface of the virtual object having generally a shortest distance from the position of the viewpoint.

3. An information processing method according to claim 1, wherein the coordinate value of the scaling center is a coordinate value of a point on a surface of the virtual object, being positioned on a plane perpendicular to a straight line interconnecting the position of the viewpoint and the point having generally the shortest distance from the viewpoint, the plane intersecting a point having generally a shortest distance from the position of the viewpoint.

4. An information processing method according to claim 1, wherein a plane perpendicular to a straight line interconnecting the viewpoint and a point having a shortest distance from the viewpoint is obtained for each of a plurality of positions of viewpoints, and the coordinate value of the scaling center is obtained in accordance with the plane obtained for each of the plurality of positions of the viewpoints.

5. An information processing method according to claim 1, wherein the coordinate value of the scaling center is a coordinate value of a point having generally a minimum value of a square sum of distances from a plurality of point views.

6. An information processing method according to claim 1, wherein the coordinate value of the scaling center is a coordinate value of a center of gravity of a plurality of viewpoints.

7. An information processing method according to claim 1, wherein one, two or three viewpoints are selected from a plurality of viewpoints and the coordinate value of the scaling center is obtained from the positions of selected viewpoints.

8. An information processing method of controlling a scaling process for a virtual object disposed in a virtual space shared by an observer, comprising steps of:

selecting a method of obtaining a scaling center, in accordance with the number of positions of viewpoints of the observer to be considered when the scaling process is executed;

by using the selected method of obtaining the scaling center, obtaining a coordinate value of the scaling center corresponding to the position of each viewpoint of the observer; and by using the obtained coordinate value of the scaling center, executing the scaling process for the virtual object.

9. An information processing method of controlling a scaling process for a virtual object disposed in a virtual space, comprising steps of:

selecting a method of obtaining a scaling center, in accordance with the contents of the scaling process;

by using the selected method of obtaining the scaling center, obtaining a coordinate value of the scaling center corresponding to the position of a viewpoint of an observer; and by using the obtained coordinate value of the scaling center, executing the scaling process for the virtual object.

10. A program for performing an information processing method of obtaining a scaling center of a virtual object disposed in a virtual space and generating an image containing the virtual object corresponding to a position of a viewpoint, the program comprising steps of:

obtaining a coordinate value of the scaling center in accordance with the viewpoint; and executing a scaling process for the virtual object by using the coordinate value of the scaling center.

11. A program for performing an information processing method of controlling a scaling process for a virtual object disposed in a virtual space shared by an observer, the program comprising steps of:

selecting a method of obtaining a scaling center, in accordance with the number of positions of viewpoints of the observer to be considered when the scaling process is executed;

by using the selected method of obtaining the scaling center, obtaining a coordinate value of the scaling center corresponding to the position of each viewpoint of the observer; and by using the obtained coordinate value of the scaling center, executing the scaling process for the virtual object.

12. A program for performing an information processing method of controlling a scaling process for a virtual object disposed in a virtual space, the program comprising steps of:

selecting a method of obtaining a scaling center, in accordance with the contents of the scaling process;

by using the selected method of obtaining the scaling center, obtaining a coordinate value of the scaling center corresponding to the position of a viewpoint of an observer; and by using the obtained coordinate value of the scaling center, executing the scaling process for the virtual object.

13. An information processing apparatus having detecting means for detecting information of a viewpoint of an observer and generating means for generating an image as observed in a virtual space in which a virtual object is disposed, in accordance with the view angle information, comprising:

calculating means for calculating a coordinate value of a scaling center of the virtual object in accordance with the viewpoint information and position information of the virtual object; and scaling processing means for executing a scaling process for the virtual object by using the calculated scaling center.

14. An information processing apparatus for controlling a scaling process for a virtual object disposed in a virtual space shared by an observer, comprising:

selecting means for selecting a method of obtaining a scaling center, in accordance with the number of positions of viewpoints of the observer to be considered when the scaling process is executed;

means for obtaining a coordinate value of the scaling center corresponding to the position of each viewpoint of the observer, by using the selected method of obtaining the scaling center; and means for executing the scaling process for the virtual object, by using the obtained coordinate value of the scaling center.

15. An information processing apparatus for controlling a scaling process for a virtual object disposed in a virtual space, comprising:

means for selecting a method of obtaining a scaling center, in accordance with the contents of the scaling process;

means for obtaining a coordinate value of the scaling center corresponding to the position of a viewpoint of an observer, by using the selected method of obtaining the scaling center; and     means for executing the scaling process for the virtual object, by using the obtained coordinate value of the scaling center.

* * * * *